United States Patent
Ishikawa et al.

(10) Patent No.: US 7,381,493 B2
(45) Date of Patent: Jun. 3, 2008

(54) SEPARATOR FOR FUEL CELL AND PROCESS FOR PRODUCING THE SAME

(75) Inventors: Hideto Ishikawa, Shizuoka (JP); Atsushi Omura, Shizuoka (JP); Tsuyoshi Inagaki, Shizuoka (JP); Kouji Nagai, Shizuoka (JP); Tetsuo Ohinata, Shizuoka (JP)

(73) Assignee: Nichias Corporation, Tokyo (JP)

( * ) Notice: Subject to any disclaimer, the term of this patent is extended or adjusted under 35 U.S.C. 154(b) by 500 days.

(21) Appl. No.: 10/953,498

(22) Filed: Sep. 30, 2004

(65) Prior Publication Data

US 2005/0123822 A1    Jun. 9, 2005

(30) Foreign Application Priority Data

Sep. 30, 2003  (JP) .............................. 2003-340040

(51) Int. Cl.
    *H01M 8/02*  (2006.01)
(52) U.S. Cl. .......................................... 429/34; 429/39
(58) Field of Classification Search ............ 429/34–39
    See application file for complete search history.

(56) References Cited

U.S. PATENT DOCUMENTS

2002/0045086 A1* 4/2002 Tsuji et al. ................... 429/34

FOREIGN PATENT DOCUMENTS

| GB | 2336712 | A | * | 10/1999 |
| JP | 05151980 | A | * | 6/1993 |
| JP | 2000-48830 | | | 2/2000 |
| JP | 2000-77081 | | | 3/2000 |
| JP | 2000133282 | A | * | 5/2000 |
| JP | 2000-243409 | | | 9/2000 |
| JP | 2002-358973 | | | 12/2002 |

* cited by examiner

*Primary Examiner*—Gregg Cantelmo
(74) *Attorney, Agent, or Firm*—Nixon & Vanderhye P.C.

(57) ABSTRACT

The present invention provides a separator for fuel cell containing: a flat plate member; a gas passage-side member provided on one side of the flat plate member and having passages for passing a reactant gas therethrough; and a cooling water passage-side member provided on the other side of the flat plate member and having passages for passing cooling water therethrough, wherein the gas passage-side member and the cooling water passage-side member are formed from first and second conductive resin compositions which are different from each other, respectively, and the difference between the thermal expansion coefficient of the gas passage-side member in its thickness direction and the thermal expansion coefficient of the cooling water passage-side member in a direction perpendicular to its thickness direction is $25\times10^{-6}$ /K or smaller, and wherein the flat plate member contains at least one of the first and second conductive resin compositions.

5 Claims, 1 Drawing Sheet

SEPARATOR FOR FUEL CELL AND PROCESS FOR PRODUCING THE SAME

FIELD OF THE INVENTION

The present invention relates to a separator for fuel cells and a process for producing the same.

BACKGROUND OF THE INVENTION

In recent years, the demand for fuel cells in which chemical energy of a fuel is directly converted into electrical energy has been growing. In general, a fuel cell has a structure comprising a stack of many unit cells each comprising electrode plates, an electrolyte film sandwiched therebetween, and a separator disposed on an outer side of these.

FIG. 1 is a diagrammatic illustration showing the appearance of a general separator for fuel cells. This separator has a constitution in which a flat plate member 6 has first partition walls 7a protruding from one side thereof at a predetermined interval to form channels 8a through which a reactant gas (hydrogen or oxygen) is to be passed, and further has second partition walls 7b protruding from the other side thereof at a predetermined interval to form channels 8b through which cooling water is to be passed. Hereinafter, the side on which the channels 8a for passing a reactant gas therethrough have been formed is referred to as "gas passage-side", while the side on which the channels 8b for passing cooling water therethrough have been formed is referred to as "cooling water passage-side" (see FIG. 2).

In fabricating a fuel cell, many such fuel-cell separators 5 are stacked in the direction of projection of the partition walls 7a and 7b (upward/downward direction in the figure). The airtightness of the channels 8a and 8b is hence important, and strength and dimensional accuracy are required of the partition walls 7a and 7b. In the field where a high voltage is required as in, e.g., motor vehicles, several hundred unit cells are stacked to fabricate a cell. Since this stack is generally used under the conditions of about 80° C., the separators are required to have dimensional stability to heat (low thermal expansivity). In case where the separators have high thermal expansivity, the stack as a whole expands thermally and the clamping load hence increases. As a result, the fuel-cell separators themselves and the electrolyte films break. There are also cases where due to the insufficient strength, insufficient plate-thickness dimensional accuracy, and warpage of the separators, etc., stack assembly encounters difficulties in assembly operation, breakage, and other troubles.

In particular, the warpage of fuel-cell separators not only makes stack assembly difficult but also results in insufficient contact between unit cells after assembly. As a result, contact electrical resistance becomes uneven, leading to a decrease in power generation performance. There are also cases where an offset load breaks the fuel-cell separators themselves.

On the other hand, fuel-cell separators 5 are generally obtained by molding into a predetermined shape a conductive resin composition comprising a resin and a conductive filler dispersed therein, since this method is advantageous in productivity. Examples of such methods which have been proposed include: a method comprising dry-blending a phenolic resin with an expanded graphite, filling the blend into a mold, and compression-molding it (see reference 1); a method in which a powdery mixture obtained by dry-blending a phenolic resin with an expanded graphite is compacted to produce a preform, and this preform is cured and compression-molded (see reference 2); and a method comprising kneading a phenolic resin together with a carbon powder by means of a pressure kneader or the like, and compression-molding the mixture to obtain a molding (see reference 3).

However, those methods in which a conductive resin composition is molded have the following disadvantages. As the sectional view of FIG. 2 shows schematically, there is a difference in the orientation of the conductive filler, e.g., expanded graphite, between the thickness direction (upward/downward direction on the page) and the direction perpendicular to the thickness direction (left/right direction on the page) due to a difference in shape between the gas passage-side and the cooling water passage-side. Hereinafter, the direction perpendicular to the thickness direction is simply referred to as the horizontal direction. As a result, differences in thermal expansion arise, and local differences in elongation hence occur, resulting in warpage or undulation of the separator. Techniques for warpage reduction which have been proposed include: a method in which a powdery mixture of a thermosetting resin and a carbon powder is press-molded with heating, and the resultant molding is released from the mold and then heated while being sandwiched between smooth-surface plates, at a temperature which is 50-100% of the curing temperature (see reference 4); and a method in which a high-strength high-rigidity material is used as a frame material (see reference 5).

[Reference 1] JP 2000-48830 A
[Reference 2] JP 2000-77081 A
[Reference 3] JP 2000-243409 A
[Reference 4] JP 2000-243409 A
[Reference 5] JP 2002-358973 A However, those related techniques for warpage reduction are ineffective in eliminating the differences in thermal expansion coefficient attributable to the difference in conductive-filler orientation between the gas passage-side and the cooling water passage-side, and the degree of warpage reduction attainable therewith is limited. Although use of a separator having a high elastic modulus can reduce warpage or undulation, the high elastic modulus may raise problems such as breakage, chipping, etc. in stack assembly.

An object of the invention is to provide a separator for fuel cells which is reduced in warpage. Another object of the invention is to provide a process by which a fuel-cell separator reduced in warpage is produced by a relatively easy economical method.

SUMMARY OF THE INVENTION

The present inventors have made eager investigation to examine the problem. As a result, it has been found that when preforms produced from respective materials differing in thermal expansion coefficient are used in combination and integrally molded, then a separator for fuel cells is obtained which can have a controlled difference in thermal expansion between the gas passage-side and the cooling water passage-side, and can have a warpage reduced to 1 mm or less. With this finding, the present invention is accomplished.

The present invention is mainly directed to the following items:

(1) A separator for fuel cell comprising: a flat plate member; a gas passage-side member provided on one side of the flat plate member and having passages for passing a reactant gas therethrough; and a cooling water passage-side member provided on the other side of the flat plate member and having passages for passing cooling water therethrough, wherein the gas passage-side member and the cooling water passage-side member are formed from first and second conductive resin compositions which are different from each other, respectively, and the difference between the thermal expansion coefficient of the gas passage-side member in its thickness direction and the thermal expansion coefficient of the cooling water passage-side member in a direction perpendicular to its thickness direction is $25 \times 10^{-6}$ /K or smaller, and wherein the flat plate member comprises at least one of the first and second conductive resin compositions.

(2) The separator for fuel cell according to item 1, wherein the first and second conductive resin compositions are formed from: 20 to 85% by weight of a dimensionally anisotropic conductive filler; 20 to 40% by weight of a thermosetting resin; 15 to 30% by weight of a spherical filler; and 5 to 10% by weight of a carbon fiber, based on the total weight of the conductive resin composition, provided that the first and second conductive resin compositions are different from each other in the proportion of these components.

(3) The separator for fuel cell according to item 2, wherein the dimensionally anisotropic conductive filler comprises an expanded graphite.

(4) The separator for fuel cell according to item 2, wherein the spherical filler comprises at least one member selected from the group consisting of a spherical inorganic compound and a spherical graphite.

(5) The separator for fuel cell according to item 3, wherein the spherical filler comprises at least one member selected from the group consisting of a spherical inorganic compound and a spherical graphite.

(6) A process for producing a separator for fuel cell comprising: a flat plate member; a gas passage-side member provided on one side of the flat plate member and having passages for passing a reactant gas therethrough; and a cooling water passage-side member provided on the other side of the flat plate member and having passages for passing cooling water therethrough, which comprises the steps of: preparing a first conductive resin composition by melt-mixing a thermosetting resin, a dimensionally anisotropic conductive filler, a spherical filler and a carbon fiber in a predetermined proportion; preparing a second conductive resin composition by melt-mixing a thermosetting resin, a dimensionally anisotropic conductive filler, a spherical filler and a carbon fiber in a predetermined proportion; molding the first conductive resin composition into a sheet to obtain a first preform at a temperature where the thermosetting resin does not cure completely; molding the second conductive resin composition into a sheet to obtain a second preform at a temperature where the thermosetting resin does not cure completely; and placing the first preform on the second preform to obtain a laminated product, molding the laminated product set in a mold for a separator for fuel cell at a temperature where the thermosetting resin cures completely.

DETAILED DESCRIPTION OF THE INVENTION

The invention will be explained below in detail.

Figure 1:
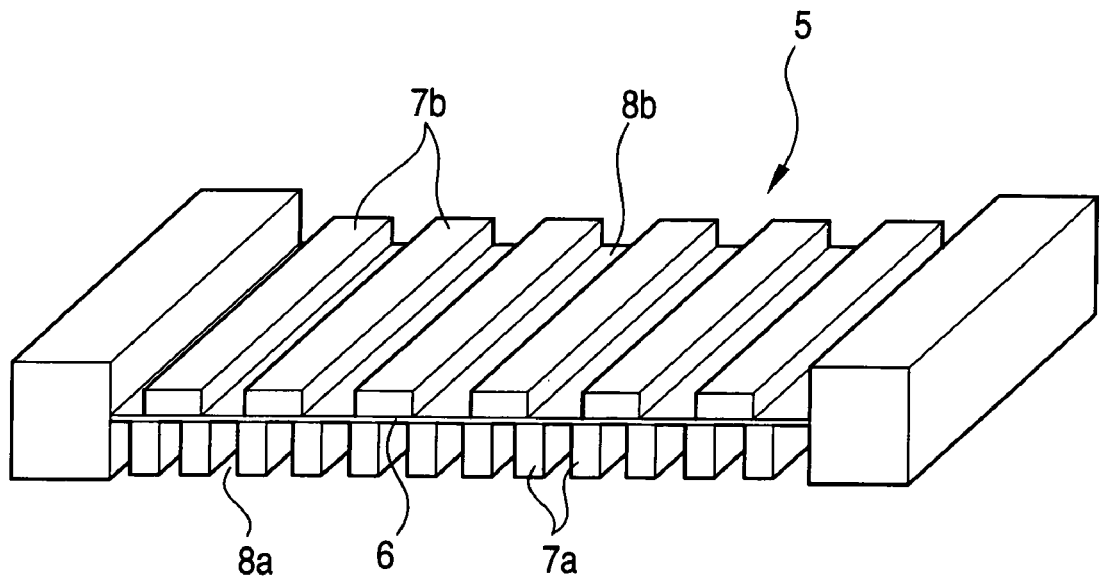
FIG. 1 is a diagrammatic drawing showing an example of fuel-cell separators according to the present invention and related-art techniques.

The shape of the separator for fuel cells of the present invention is not particularly limited. For example, the separator can have the shape shown in FIG. 1. However, the separator comprises a gas passage-side member and a cooling water passage-side member that have been formed from different conductive resin compositions. The position of the boundary between the gas passage-side member and the cooling water passage-side member is controlled, for example, by regulating each thickness of the preforms of the gas passage-side member and the cooling water passage-side member in the superposed product of the preforms before final forming of the fuel-cell separator. The conductive resin composition for the gas passage-side member and the conductive resin composition for the cooling water passage-side member each preferably comprise a dimensionally anisotropic conductive filler, a thermosetting resin, a spherical filler, and carbon fibers. These ingredients will be described below in detail. In the present invention, a dimensionally anisotropic conductive filler stands for a conductive filler having an aspect ratio of not less than 10.

<Resin>

The thermosetting resin to be preferably used comprises one or more members selected from epoxy resins, phenolic resins, furan resins, unsaturated polyester resins, polyimide resins, and the like. From the standpoints of properties to be obtained, productivity, etc., it is more preferable to use a mixture of an epoxy resin and a polyimide resin.

The term epoxy resins as used in the present invention includes all of structures formed by the reaction of a polyfunctional epoxy compound with a curing agent, and epoxy compound/curing agent combinations which give such structures. Hereinafter, an epoxy compound which has not undergone such a reaction and a structure obtained by the reaction are often referred to as an epoxy resin precursor and an epoxy compound, respectively. The amount of an epoxy resin is equal to the weight of a cured epoxy resin obtained therefrom.

Any of various known compounds can be used as an epoxy resin precursor. Examples thereof include: bifunctional epoxy compounds such as a bisphenol A diglycidyl ether type, a bisphenol F diglycidyl ether type, a bisphenol S diglycidyl ether type, a bisphenol AD diglycidyl ether type, and a resorcinol diglycidyl ether type; polyfunctional epoxy compounds such as a phenolic novolak type and a cresol novolak type; and linear aliphatic epoxy compounds such as an epoxidized soybean oil; alicyclic epoxy compounds; heterocyclic epoxy compounds; glycidyl ester epoxy compounds; and glycidylamine epoxy compounds. However, epoxy resin precursors usable in the present invention should not be construed as being limited to these examples. Also usable are compounds having substituents, e.g., halogens, and compounds having a hydrogenated aromatic ring. The epoxy equivalent, molecular weight, number of epoxy groups, and the like of each of those compounds also are not particularly limited. However, when an epoxy resin precursor consisting mainly of an epoxy compound having an epoxy equivalent of about 400 or higher, especially about 700 or higher, is used, then a prolonged pot life can be obtained. In addition, since such compounds are solid at ordinary temperature, they are easy to handle in powder molding. It is also possible to use two or more epoxy compounds in combination. For example, an epoxy resin precursor having an epoxy equivalent of about 200 and giving a cured resin having a dense network structure is mixed with a precursor having an epoxy equivalent of about 900 and a long pot life. This mixture can be handled as a powder or as a liquid having a slightly long pot life.

Those epoxy resin precursors react with a curing agent to give cured epoxy resins. As the curing agent also, various known compounds can be used. Examples thereof include: aliphatic, alicyclic, and aromatic polyamines such as dimethylenetriamine, triethylenetetramine, tetraethylenepentamine, menthenediamine, and isophoronediamine and carbonates of these polyamines; acid anhydrides such as phthalic anhydride, methyltetrahydrophthalic anhydride, and trimellitic anhydride; polyphenols such as phenolic novolak; polymercaptans; anionic polymerization catalysts such as tris(dimethylaminomethyl)phenol, imidazole, and ethylmethylimidazole; cationic polymerization catalysts such as $BF_3$ and complexes thereof; and latent curing agents which generate these compounds upon pyrolysis or photodecomposition. However, the curing agent should not be construed as being limited to these examples. It is also possible to use two or more curing agents in combination.

The term polyimides as used in the present invention includes all polymers having imide groups ($(—CO—)_2N—$) in the molecule. Examples thereof include: thermoplastic polyimides such as poly(amide-imide)s and polyetherimides; non-thermoplastic polyimides such as (wholly) aromatic polyimides; and thermosetting polyimides such as bismaleimide-based polyimides, nadic acid-based polyimides, e.g., allylnadimide-based ones, and acetylene-based polyimides. However, the polyimides should not be construed as being limited to these examples. It is also possible to use two or more polyimides in combination.

It is especially preferred in the present invention to use thermosetting polyimides among those polyimides. Thermosetting polyimides have an advantage over thermoplastic polyimides and non-thermoplastic (aromatic) polyimides that they are easy to process. Although inferior in the properties to non-thermoplastic polyimides, thermosetting polyimides are excellent in high-temperature properties among various organic polymers. In addition, thermosetting polyimides develop almost no voids or cracks through curing. Thermosetting polyimides are hence suitable for use as a component of the conductive resin compositions.

The proportion of an epoxy resin and that of a polyimide resin in the resin are preferably 5 to 95% by weight and 95 to 5% by weight based on the total weight of the thermosetting resin composition, respectively. In case where the proportion of each resin is lower than 5% by weight, the advantage brought about by using these resins in combination is only slight. The ratio of the amount of an epoxy resin to that of a polyimide resin is more preferably from 95/5 to 30/70, further more preferably from 85/15 to 60/40.

The amount of the thermosetting resin to be incorporated into each of the conductive resin composition for the gas passage-side member and the conductive resin composition for the cooling water passage-side member is preferably 20 to 40%, more preferably 20 to 30% by weight based on the whole conductive resin composition. In case where the amount thereof is smaller than 20% by weight, the material shows reduced flowability and is difficult to mold into a desired shape. In addition, the function of the resin as a binder is lessened to pose problems, for example, that the resultant molding shows enhanced thickness memory and a desired thickness cannot be obtained. On the other hand, in case where the amount thereof exceeds 40% by weight, not only the resultant separator has insufficient strength and reduced electrical conductivity, but also the enhanced flowability of the composition poses problems, for example, that molding of the composition results in an increased amount of barrs and the sticking of the molded article to the mold.

<Dimensionally Anisotropic Conductive Filler>

Expanded graphite is preferably used as the dimensionally anisotropic conductive filler. At least one member selected from artificial graphite, carbon black, Ketjen black, and the like is optionally used in combination therewith. Although two or more dimensionally anisotropic conductive fillers may be used in combination, it is preferred to mainly use expanded graphite from the standpoints of moldability and profitability. Expanded graphite is a graphite which is obtained, e.g., by treating flake graphite with concentrated sulfuric acid, and heating the treated graphite to enlarge the interplanar spacing in the crystal structure of graphite, and is highly bulky. The expanded graphite to be used has a bulk specific gravity of preferably about 0.3 or lower, more preferably about 0.1 or lower, further more preferably about 0.05 or lower. Use of expanded graphite having such a bulk specific gravity gives a separator satisfactory especially in strength, electrical conductivity, and lubricity. Unless otherwise noted, the term "conductive filler" hereinafter stands for "dimensionally anisotropic conductive filler".

The amount of the conductive filler to be incorporated into each of the conductive resin composition for the gas passage-side member and the conductive resin composition for the cooling water passage-side member is preferably 20 to 85%, more preferably 25 to 85% by weight, further more preferably 30 to 85% by weight of the whole conductive resin composition. In case where the amount of the conductive filler incorporated is smaller than 20% by weight, satisfactory electrical conductivity cannot be obtained. In case where the amount thereof exceeds 85% by weight, problems concerning strength or molding operation arise.

<Spherical Filler>

Figure 2:
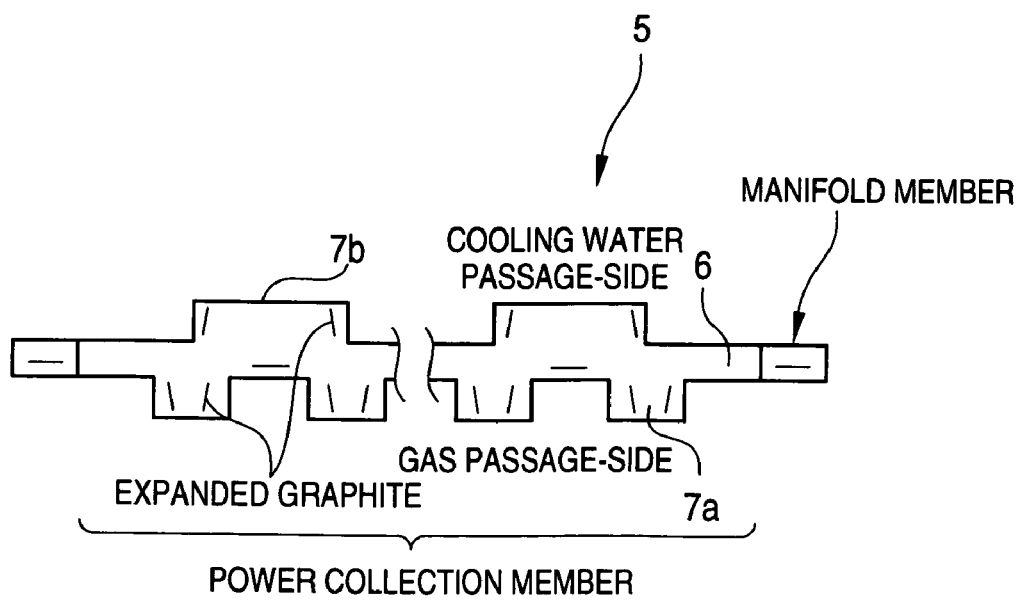
FIG. 2 is a schematic drawing showing the oriented state of a dimensionally anisotropic conductive filler (expanded graphite) in a fuel-cell separator.

As shown in FIG. 2, when a conductive resin composition is molded into a plate form, the molding obtained has a considerable difference in thermal expansion coefficient between the horizontal direction and the thickness direction due to the anisotropy of the expanded graphite. A spherical filler is added in order to diminish such anisotropy.

As the spherical filler is preferably used one or more material selected from spherical inorganic compound such as spherical silica and hollow silica, and spherical graphite (artificial graphite), which are low-thermal-expansion materials. Although the kind of the spherical filler is not particularly limited, spherical graphite is more preferable than the silicas from the standpoint of electrical conductivity because it can be used also as a filler having electrically conductive. Due to the presence of the spherical filler in each conductive resin composition, the expanded graphite is apt to be oriented also in the molding thickness direction around the particles of the spherical filler. As a result, the difference in thermal expansion coefficient between the thickness direction and the horizontal direction decreases. Furthermore, the larger the diameter of the spherical filler, the more the expanded graphite is apt to be oriented in the thickness direction.

However, use of a spherical filler having too large a particle diameter may yield a fuel-cell separator in which the spherical filler is partly exposed on the separator surface to cause a decrease in contact resistance. It is therefore preferable that the particle diameter of the spherical filler be up to 25% of the thickness of the thinnest part of the fuel-cell separator. For example, when the thinnest part of the fuel-cell separator has a thickness of 0.5 mm, the diameter of the spherical filler is preferably 125 μm or smaller, more preferably 50 μm or smaller. On the other hand, since use of a spherical filler having too small a particle diameter is ineffective in orientation regulation, the particle diameter of the spherical filler is preferably 10 μm or larger.

The amount of the spherical filler to be incorporated into each of the conductive resin composition for the gas passage-side member and the conductive resin composition for the cooling water passage-side member is preferably 15 to 30% by weight, more preferably about 15 to 25% by weight based on the whole conductive resin composition. In case where the amount of the spherical filler incorporated is smaller than 15% by weight, the orientation of the expanded graphite cannot be controlled satisfactorily and, hence, a reduction in the difference in thermal expansion coefficient is not attained, resulting in a warped fuel-cell separator. In case where the amount thereof exceeds 30% by weight, particles of the spherical filler may be exposed on the surface of the resultant fuel-cell separator and this may increase contact resistance and reduce the strength and gas impermeability of the separator.

<Carbon Fibers>

As the carbon fibers are preferably used one or more members selected from PAN-derived carbon fibers, pitch-derived carbon fibers, and rayon-derived carbon fibers. The addition of carbon fibers improves the strength, especially impact strength, of the fuel-cell separator while exerting almost no influence on the electrical conductivity and thermal expansivity of the separator. The shape of the carbon fibers is not particularly limited. However, the carbon fibers to be used have a fiber length of preferably about 0.01 to 100 mm, more preferably 0.1 to 20 mm. In case where the fiber length thereof exceeds 100 mm, difficulties are encounted in molding and a smooth surface is difficult to obtain. In case where the fiber length thereof is shorter than 0.01 mm, a reinforcing effect cannot be expected.

The amount of the carbon fibers to be incorporated into each of the conductive resin composition for the gas passage-side member and the conductive resin composition for the cooling water passage-side member is preferably 5 to 10% by weight based on the whole conductive resin composition. In case where the amount of the carbon fibers incorporated is smaller than 5% by weight, satisfactory impact resistance is not obtained. In case where the amount thereof exceeds 10% by weight, problems concerning molding operation arise.

The conductive resin composition for the gas passage-side member and the conductive resin composition for the cooling water passage-side member each preferably comprise a thermosetting resin, a conductive filler, a spherical filler, and carbon fibers in respective amounts within the ranges shown above.

In the present invention, the difference in the thickness-direction thermal expansion coefficient of the gas passage-side member and the horizontal-direction thermal expansion coefficient of the cooling water passage-side member is controlled to be $25 \times 10^{-6}$ /K or smaller. The difference thereof can be controlled by regulating the proportion among these ingredients mentioned above in each composition and the particle diameter of the spherical filler. This difference in thermal expansion coefficient varies also depending on the shapes of the gas passage-side and cooling water passage-side, e.g., the number and interval of the partition walls 7a, those of the partition walls 7b, sectional shape of each partition wall, etc. Consequently, these factors also are taken into account in determining the makeup of each of the conductive resin composition for the gas passage-side member and the conductive resin composition for the cooling water passage-side member.

<Process for Producing Separator for Fuel Cell>

The process for producing the separator for fuel cells is explained below.

First, a conductive filler, a thermosetting resin, a spherical filler, and carbon fibers are mixed together in a predetermined proportion in order to obtain a conductive resin composition for a gas passage-side member. For the mixing may be used a Henschel mixer, supermixer, Labo-Plastomill, pressure kneader, single-screw extruder, or the like. The ingredients are mixed while melting the thermosetting resin at such a temperature that the resin does not cure. In the same manner, a conductive resin composition for a cooling water passage-side member is prepared by melt-mixing a conductive filler, a thermosetting resin, a spherical filler, and carbon fibers in a given proportion.

The conductive resin compositions prepared through melt mixing each are temporarily molded into a sheet. Prior to this temporary molding, the compositions are pulverized with a Henschel mixer, ball mill, or the like and classified so as to facilitate packing into molds. The average particle diameter of each composition is preferably 500 μm or smaller from the standpoints of ease of packing into molds and moldability.

Subsequently, the powder of the conductive resin composition for a gas passage-side member and the powder of the conductive resin composition for a cooling water passage-side member each are packed into a mold and pressed at such a temperature that the thermosetting resin does not cure completely (about 50 to 120° C.). Thus, the powders are molded into sheet-form preforms.

Thereafter, the sheet-form preform obtained from the conductive resin composition for a gas passage-side member and the sheet-form preform obtained from the conductive resin composition for a cooling water passage-side member are superposed and set in a mold for fuel-cell separators. Final molding is then conducted, for example, under the conditions of a mold temperature of 150 to 200° C., molding pressure of 70 to 100 MPa, and curing time of 10 minutes so as to completely cure the thermosetting resin.

The sheet-form preform obtained from the conductive resin composition for a gas passage-side member and the sheet-form preform obtained from the conductive resin composition for a cooling water passage-side member may have the same or different thicknesses. It is also possible to use a method in which the two sheet-form preforms are produced so as to have the same thickness and the two kinds of preforms are superposed in different numbers of sheets. The position of the boundary between the gas passage-side member and the cooling water passage-side member varies depending on the thicknesses of the two sheet-form preforms.

The fuel-cell separator thus obtained is composed of a gas passage-side member and a cooling water passage-side member, wherein the two members having been formed from different conductive resin compositions and the plate member 6 has at least one of the two conductive resin compositions. In addition, the difference between the thickness-direction thermal expansion coefficient of the gas passage-side member and the horizontal-direction thermal expansion coefficient of the cooling water passage-side member is $25 \times 10^{-6}$/K or smaller. Because the difference in thermal expansion coefficient has been thus controlled, the fuel-cell separator produced is considerably inhibited from warping as compared with fuel-cell separators heretofore in use.

EXAMPLES

The present invention is now illustrated in greater detail with reference to Examples and Comparative Examples, but it should be understood that the present invention is not to be construed as being limited thereto.

temperature of 170° C. and a pressure of 100 MPa to produce a sheet-form molding. The samples thus produced were subjected to the following property evaluations.

Measurement of Thermal Expansion Coefficient

A 5 mm-square test piece having a thickness of 10 mm was cut out of each sample. This test piece was examined for the coefficient of thickness-direction thermal expansion and the coefficient of horizontal-direction thermal expansion with "TMA8310", manufactured by Rigaku Corp., in the range of 28 to 100° C. under the conditions of a probe diameter of 3 mm, load of 0.1 N, and heating rate of 1° C./min. The results obtained are shown in Table 1.

TABLE 1

|  |  | Mixture 1 | Mixture 2 | Mixture 3 | Mixture 4 | Mixture 5 | Mixture 6 |
|---|---|---|---|---|---|---|---|
| Material | Expanded graphite | 70 | 40 | 50 | 50 | 50 | 50 |
|  | Spherical silica | — | 30 | 20 | 13.3 | — | — |
|  | Spherical graphite | — | — | — | — | 20 | — |
|  | Carbon fibers | — | 10 | — | 6.7 | — | 20 |
|  | Epoxy resin | 25 | 15 | 25 | 25 | 25 | 25 |
|  | Polyimide resin | 5 | 5 | 5 | 5 | 5 | 5 |
| Thermal expansion coefficient | Thickness direction | 46.5 | 18.1 | 30.9 | 32.8 | 30.3 | 37.1 |
|  | Horizontal direction | 5.9 | 8.9 | 11.9 | 10.1 | 7.8 | 7.7 |

Note 1)
The amounts in each mixture are in % by weight
Note 2)
Thermal expansion coefficient: $\times 10^{-6}$/K Material Preparation Expanded graphite (EXP60M, manufactured by Nippon Graphite Industries, Ltd.), an epoxy resin (bisphenol A type epoxy resin having an epoxy equivalent of 300 to 500 with dicyandiamide as a curing agent, available from Japan Epoxy Resins Co., Ltd. or NIPPON KAYAKU CO., LTD.), a polyimide resin (KIR30, manufactured by KYOCERA Chemical Corporation), carbon fibers (S242, manufactured by Donak Corp.), and spherical silica (FB74, manufactured by Denki Kagaku Kogyo Kabushiki Kaisha) and spherical graphite (AT5, manufactured by Oriental Sangyo Co., Ltd.) each having an average particle diameter of about 50 μm were introduced, according to each of the formulations shown in Table 1, into a Henschel mixer (Type FM10C/I, manufactured by Mitsui Mining Co., Ltd.). The ingredients were dry-blended. The powdery mixture obtained was mixed by means of a pressure kneader (Type D3-7.5G, manufactured by Moriyama Co., Ltd.) while melting the resin.

Production of Samples for Property Evaluation

Each mixture material obtained above was packed into a mold and pressed for 2 minutes under the conditions of a mold temperature of 100° C. and a pressure of 100 MPa to produce a sheet-form preform. The preform obtained was pressed for 10 minutes under the conditions of a mold Production of Fuel-Cell Separators to be Tested Expanded graphite, an epoxy resin, a polyimide resin, carbon fibers, and spherical silica and spherical graphite each having an average particle diameter of about 50 μm were introduced, according to each of the formulations shown in Table 1, into a Henschel mixer (Type FM10C/I, manufactured by Mitsui Mining Co., Ltd.). The ingredients were dry-blended. The powdery mixture obtained was mixed by means of a pressure kneader (Type D3-7.5G, manufactured by Moriyama Co., Ltd.) while melting the resin. Subsequently, the mixture was charged into a mold having a length of 300 mm and a width of 250 mm and pressed at a mold temperature of 100° C. Thus, sheet-form preforms having a thickness of about 0.75 mm were produced.

The sheet-form preforms were superposed according to each of the combinations shown in Table 2. Each combination was set in a mold for fuel-cell separators and hot-pressed at 170° C. for 10 minutes to obtain a fuel-cell separator to be tested which had a thickness of 1.5 mm. The mold had a length of 300 mm and a width of 250 mm, and had 60 grooves with a width of 2 mm and a depth of 0.25 mm on one side (cooling water passage-side) and 120 grooves with a width of 1 mm and a depth of 0.5 mm on the other side (gas passage-side).

Measurement of Warpage Amount

Each fuel-cell separator to be tested was placed on a surface plate and examined with a three-dimensional laser analyzer (manufactured by Coms Co., Ltd.) with respect to 35 points in the separator surface. The difference between the maximum found value and the minimum found value was taken as warpage amount. The results obtained are shown in Table 2.

Measurement of Flexural Strength and Flexural Modulus

Expanded graphite, an epoxy resin, a polyimide resin, carbon fibers, and spherical silica and spherical graphite each having an average particle diameter of about 50 μm were introduced, according to each of the formulations shown in Table 1, into a Henschel mixer (Type FM10C/I, manufactured by Mitsui Mining Co., Ltd.). The ingredients were dry-blended. The powdery mixture obtained was mixed by means of a pressure kneader (Type D3-7.5G, manufactured by Moriyama Co., Ltd.) while melting the resin. Subsequently, the mixture was charged into a mold having a length of 300 mm and a width of 250 mm and pressed at a mold temperature of 100° C. Thus, sheet-form preforms having a thickness of about 1.0 mm were produced.

The sheet-form preforms were superposed according to each of the combinations shown in Table 2. Each combination was pressed at 170° C. for 10 minutes to obtain a sheet-form molding having a thickness of 2 mm. A test piece having a width of 20 mm, length of 100 mm, and thickness of 2 mm was cut out of the molding. This test piece was examined with Autograph "AG-100kND", manufactured by Shimadzu Corp., to determine the flexural strength and flexural modulus thereof in a 100° C. atmosphere in accordance with JIS K7171. The results obtained are shown in Table 2.

be apparent to one skilled in the art that various changes and modifications can be made therein without departing the spirit and scope thereof.

The present application is based on Japanese Patent Application No. 2003-340040 filed on Sep. 30, 2003, and the contents thereof are incorporated herein by reference.

What is claimed is:

1. A separator for fuel cell comprising:
   a flat plate member;
   a gas passage-side member provided on one side of the flat plate member and having passages for passing a reactant gas therethrough; and
   a cooling water passage-side member provided on the other side of the flat plate member and having passages for passing cooling water therethrough,
   wherein the gas passage-side member and the cooling water passage-side member are formed from first and second conductive resin compositions which are different from each other, respectively, and the difference between the thermal expansion coefficient of the gas passage-side member in its thickness direction and the thermal expansion coefficient of the cooling water passage-side member in a direction perpendicular to its thickness direction is $25 \times 10^{-6}$/K or smaller,
   wherein the flat plate member comprises at least one of the first and second conductive resin compositions.

2. The separator for fuel cell according to claim 1, wherein the first and second conductive resin compositions are formed from
   a dimensionally anisotropic conductive filler;
   a thermosetting resin;
   a spherical filler; and
   a carbon fiber.

TABLE 2

| | Preform | | Thermal expansion coefficient ($\times 10^{-6}$/K) | | | | | | | |
| | | | Gas passage-side | | Cooling water passage-side | | | | | |
| | Gas passage side | Cooling water passage side | Thickness direction (A) | Horizontal direction (B) | Thickness direction (C) | Horizontal direction (D) | (A) − (D) | Warpage amount (mm) | Flexural strength (MPa) | Modulus (MPa) |
|---|---|---|---|---|---|---|---|---|---|---|
| Example 1 | Mixture 5 | Mixture 2 | 30.3 | 7.8 | 18.1 | 8.9 | 21.4 | 0.97 | 37.8 | 8350 |
| Example 2 | Mixture 3 | Mixture 4 | 30.9 | 11.9 | 32.8 | 10.1 | 20.8 | 0.92 | 43.8 | 9690 |
| Comparative Example 1 | Mixture 1 | Mixture 1 | 46.5 | 5.9 | 46.5 | 5.9 | 40.6 | 5.49 | 34.5 | 8390 |
| Comparative Example 2 | Mixture 1 | Mixture 6 | 46.5 | 5.9 | 37.1 | 7.7 | 38.8 | 3.86 | 42.4 | 9240 |

Table 2 shows that as long as the difference between the thickness-direction thermal expansion coefficient of the gas passage-side and the horizontal-direction thermal expansion coefficient of the cooling water passage-side is $25 \times 10^{-6}$/K or smaller, the warpage amount can be reduced to the target value of 1 mm or below.

As mentioned above, According to the present invention, a separator for fuel cells which is reduced in warpage is obtained and this separator can be easily produced.

While the present invention has been described in detail and with reference to specific embodiments thereof, it will 3. The separator for fuel cell according to claim 2, wherein the dimensionally anisotropic conductive filler comprises an expanded graphite.

4. The separator for fuel cell according to claim 2, wherein the spherical filler comprises at least one member selected from the group consisting of a spherical inorganic compound and a spherical graphite.

5. The separator for fuel cell according to claim 3, wherein the spherical filler comprises at least one member selected from the group consisting of a spherical inorganic compound and a spherical graphite.

* * * * *